United States Patent
Jungert et al.

(10) Patent No.: US 8,430,447 B2
(45) Date of Patent: Apr. 30, 2013

(54) MOTOR VEHICLE FRONT SPOILER

(75) Inventors: Dieter Jungert, Weissach (DE); Steffen Hoelzel, Eberdingen (DE); Louis-Philippe Antoine Eugene Maria Reuvekamp, Enschede (NL); Laura van den Bosch, Doesburg (NL); Mike Ludovica Karel Peeters, Vlimmeren (BE); Gerard Nijman, Losser (NL)

(73) Assignees: Dr. Ing. H.C.F. Porsche Aktiengesellschaft (DE); Apollo Vredestein B.V. (NL)

( * ) Notice: Subject to any disclaimer, the term of this patent is extended or adjusted under 35 U.S.C. 154(b) by 22 days.

(21) Appl. No.: 13/113,269

(22) Filed: May 23, 2011

(65) Prior Publication Data

US 2012/0013145 A1 Jan. 19, 2012

(30) Foreign Application Priority Data

May 21, 2010 (DE) .......................... 10 2010 021 187

(51) Int. Cl.
*B62D 35/00* (2006.01)
(52) U.S. Cl.
USPC ...................... 296/180.1; 296/180.5; 180/903
(58) Field of Classification Search .................. 180/903; 296/180.1–180.5; *B62D 35/00*
See application file for complete search history.

(56) References Cited

U.S. PATENT DOCUMENTS

| 4,489,806 A | * | 12/1984 | Shimomura | 180/313 |
| 4,778,212 A | * | 10/1988 | Tomforde | 296/180.1 |
| 4,951,994 A | * | 8/1990 | Miwa | 296/180.1 |
| 5,454,619 A | * | 10/1995 | Haraway, Jr. | 296/180.1 |
| 6,644,700 B2 | * | 11/2003 | Ito et al. | 293/117 |
| 6,742,831 B2 | * | 6/2004 | Rees | 296/180.1 |
| 7,055,891 B2 | * | 6/2006 | Jungert | 296/180.5 |
| 7,661,753 B2 | * | 2/2010 | Shinedling et al. | 296/180.5 |
| 7,770,962 B1 | * | 8/2010 | Maxwell | 296/180.5 |
| 7,775,582 B2 | * | 8/2010 | Browne et al. | 296/180.1 |

FOREIGN PATENT DOCUMENTS

DE 103 25 653 12/2004

* cited by examiner

*Primary Examiner* — Glenn Dayoan
*Assistant Examiner* — Pinel Romain
(74) *Attorney, Agent, or Firm* — Gerald E. Hespos; Michael J. Porco; Matthew T. Hespos

(57) ABSTRACT

A motor vehicle front spoiler has a spoiler lip (11) extending in the region of a front part of the motor vehicle over the entire width or part of the width of the front part. An actuating element (12) enables the spoiler lip (11) to be shifted between an extended operating position, in which the spoiler lip (11) forms a downwardly directed extension of the front part and acts as an aerodynamic air-guiding device, and a retracted inoperative position, in which the spoiler lip (11) is directed to the rear and essentially has no aerodynamic air-guiding effect. A portion (13) of the spoiler lip (11) that is at the bottom in the operating position of the spoiler lip (11) and is in the vicinity of the roadway can be replaced.

14 Claims, 9 Drawing Sheets

MOTOR VEHICLE FRONT SPOILER

CROSS REFERENCE TO RELATED APPLICATION

This application claims priority under 35 USC 119 to German Patent Application No 10 2010 021 187.7 filed on May 21, 2010, the entire disclosure of which is incorporated herein by reference.

BACKGROUND OF THE INVENTION

1. Field of the Invention

The invention relates to a motor vehicle front spoiler with an actuating element for shifting a lip of the spoiler between an extended operating position and a retracted inoperative position.

2. Description of the Related Art

DE 103 25 653 A1 discloses a motor vehicle front spoiler with a spoiler lip that extends over the entire width or part of the width of the front part of the motor vehicle. A pneumatic actuating element can shift the spoiler lip between an extended operating position and a retracted inoperative position. The spoiler lip forms a downwardly directed extension of the front part in the extended operating position and acts as an aerodynamic air-guiding device. The spoiler lip of the front spoiler is directed to the rear in the retracted inoperative position and has essentially no aerodynamic air-guiding effect.

A bottom portion of the spoiler lip is close to the roadway when the spoiler lip of the prior art front spoiler is shifted into the operating position. Forces and moments can act on the spoiler lip due to, for example, unevenness in the carriageway, and can cause the spoiler lip to be damaged. In this case, the prior art front spoiler has to be replaced completely. This is disadvantageous.

Taking this as the starting point, the present invention is based on the object of providing a novel motor vehicle front spoiler.

SUMMARY OF THE INVENTION

The invention relates to a front spoiler with a replaceable spoiler lip located at the bottom of the spoiler and in the vicinity of the carriageway. Thus, a relatively inexpensive and simple repair of a damaged spoiler is ensured, since only that portion of the spoiler lip at the bottom and near the carriageway has to be replaced and the other subassemblies of the front spoiler can continue to be used. Furthermore, the portion of the spoiler that is at the bottom and in the vicinity of the carriageway can be replaced in a simple manner in a garage or by the customer to provide a different geometry and/or color configuration of the spoiler lip.

The spoiler lip also preferably has a top portion that is connected or fastened detachably to the bottom portion of the spoiler lip in a form-fitting and/or frictional manner. The actuating element preferably is positioned and detachably fastened by a region between the top and bottom portions of the spoiler lip.

The form-fitting and/or frictional, detachable connection of the top and bottom portions of the spoiler lip permits a particularly simple replacement of a damaged bottom portion of the spoiler lip.

The actuating element also may be fastened detachably to the top and bottom portions of the spoiler lip. Thus, the actuating element can continue to be used after a damaged bottom portion of the spoiler lip has been replaced.

Projections preferably are formed at an end of the top portion of the spoiler lip that is at the bottom in the operating position of the spoiler lip. Recesses are formed in that portion of the spoiler lip that is at the bottom in the operating position of the spoiler lip intermesh without the intermediate arrangement of a region of the actuating element. Those regions of the top portion and of the bottom portion of the spoiler lip at which the projections and recesses intermesh in a form-fitting manner without the intermediate arrangement of a region of the actuating element are offset in relation to those regions of the top portion and bottom portion of the spoiler lip on which the fastening elements engage with the intermediate arrangement of a region of the actuating element.

This detachable fastening of the two portions of the spoiler lip and of the actuating element enables the top portion and the actuating element to be reused when replacing a damaged bottom portion of the spoiler lip. Additionally, when the front spoiler is transferred between the retracted inoperative position and the extended operating position, the spoiler lip can be expanded over the width of the front part and therefore transverse to the longitudinal direction of the motor vehicle without relative movement between the two portions of the spoiler lip.

Exemplary embodiments of the invention are explained in more detail with reference to the drawing, without being restricted thereto.

DETAILED DESCRIPTION OF THE PREFERRED EMBODIMENTS

Figure 1A:
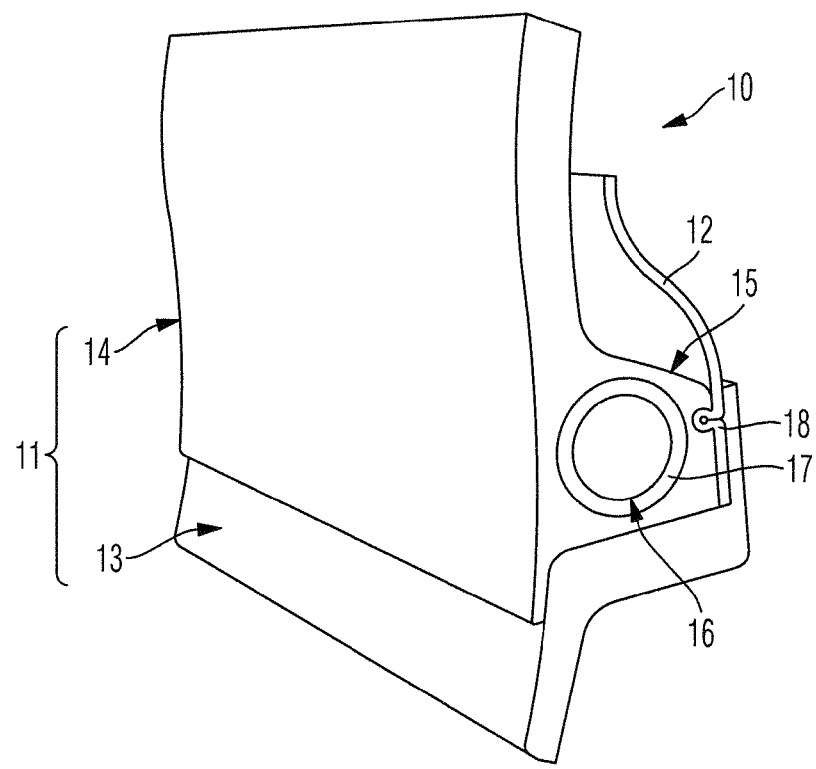
FIGS. 1a to 1g show different views of a first embodiment of a front spoiler according to the invention.

The invention relates to a motor vehicle front spoiler. A front spoiler of this type has a spoiler lip extending in the region of a front part of a motor vehicle over the entire width or part of the width of the front part.

The spoiler lip can be shifted via an actuating element, preferably a pneumatic actuating element, between an extended operating position and a retracted inoperative position. In the extended operating position, the spoiler lip forms a downwardly directed extension of the front part and acts as an aerodynamic air-guiding device. In the retracted inoperative position, the spoiler lip is directed to the rear and essentially has no aerodynamic air-guiding effect.

A front spoiler 10 according to a first embodiment of the invention is identified by the numeral 10 in FIGS. 1a to 1g. The spoiler 10 of this embodiment includes a spoiler lip 11 and an actuating element 12. The spoiler lip 11 has a portion 13 that is at the bottom in the operating position of the spoiler lip 11 and therefore is in the vicinity of a roadway. The bottom portion 13 of the front spoiler 10 can be damaged by the roadway during operation. However, the front spoiler 10 can be repaired in a simple and cost-effective manner by replacing only the damaged bottom portion 13 of the spoiler lip 11 rather than replacing the entire front spoiler 10 or the entire spoiler lip 11.

The spoiler lip 11 of the front spoiler 10 shown in FIGS. 1a to 1g also has a portion 14 that is at the top in the operating position. The two portions 13 and 14 of the spoiler lip 11 of the front spoiler 10 are connected or fastened detachably to each other in a form-fitting and/or frictional manner, as explained in greater detail below.

A thickened weatherstrip 15 is provided at the bottom end of the portion 14 of the spoiler lip 11 that is at the top in the operating position. The weatherstrip 15 has a channel 16 into which a spring-elastic element 17 is inserted. The spring-elastic element 17 may be a flexurally elastic and optionally an extensionally elastic element, for example a bar as disclosed DE 103 25 653 A1.

Forces can be applied to the spoiler lip 11 via the spring-elastic element 17. The spoiler lip 11 expands counter to the forces of the spring-elastic element 17 when the spoiler lip 11 is transferred from the inoperative position into the operating position.

However, the forces of the spring-elastic element 17 contracts the spoiler lip 11 when the spoiler lip 11 is transferred from the operating position into the inoperative position.

The portions 13 and 14 of the spoiler lip 11 that are disposed respectively at the bottom and top in the operating position of the spoiler lip 11 and also the actuating element 12 that shifts the spoiler lip 11 between the retracted inoperative position and the extended operating position are connected or fastened detachably to each other in the region of the weatherstrip 15.

Figure 1B:
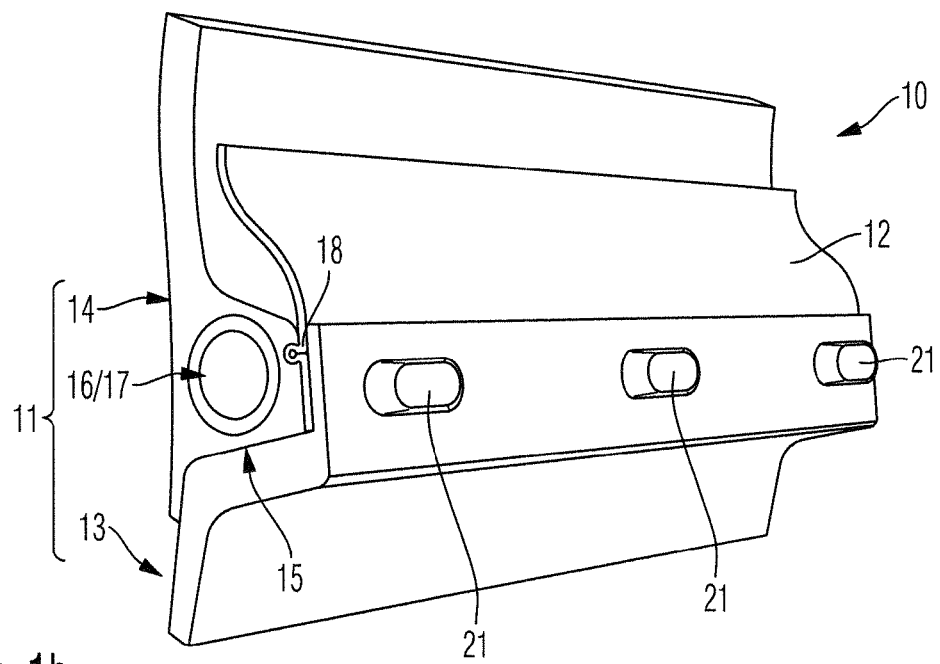
Figure 1C:
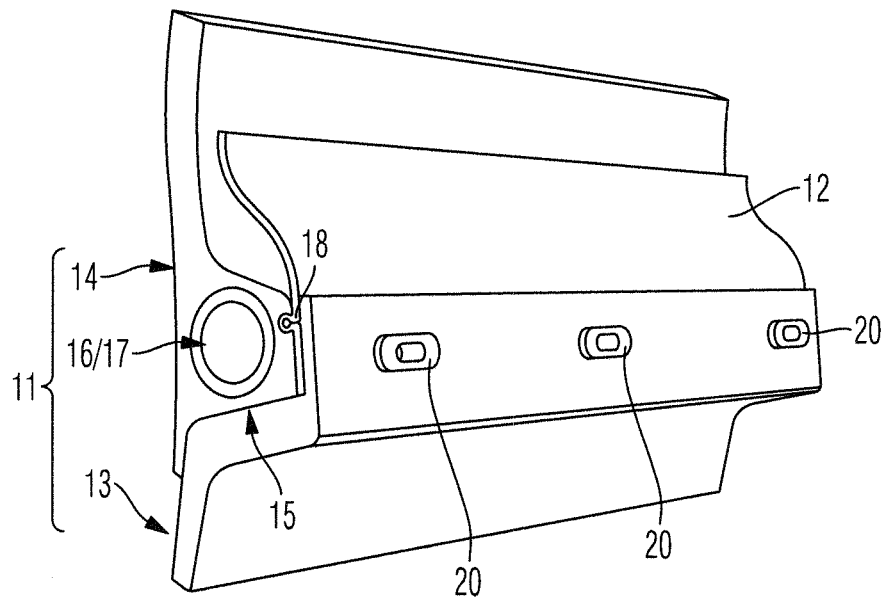

According to FIGS. 1a to 1c, the actuating element 12 is positioned partially by a region between the bottom and top portions 13 and 14 of the spoiler lip 11 and is fastened detachably by that region between the bottom and top portions 13 and 14 of the spoiler lip 11. The region of the actuating element 12 between the two portions 13 and 14 of the spoiler lip 11 has a bead 18 that is engaged in a recess or groove 19 in the weatherstrip 15 defined on the top portion 14 of the spoiler lip 11.

A seal is provided between the actuating element 12 and that portion 14 of the spoiler lip 11 that is at the top in the operating position. The seal prevents water or dirt from penetrating between the actuating element 12 and that portion 14 of the spoiler lip 11 that is at the top in the operating position.

Figure 1D:
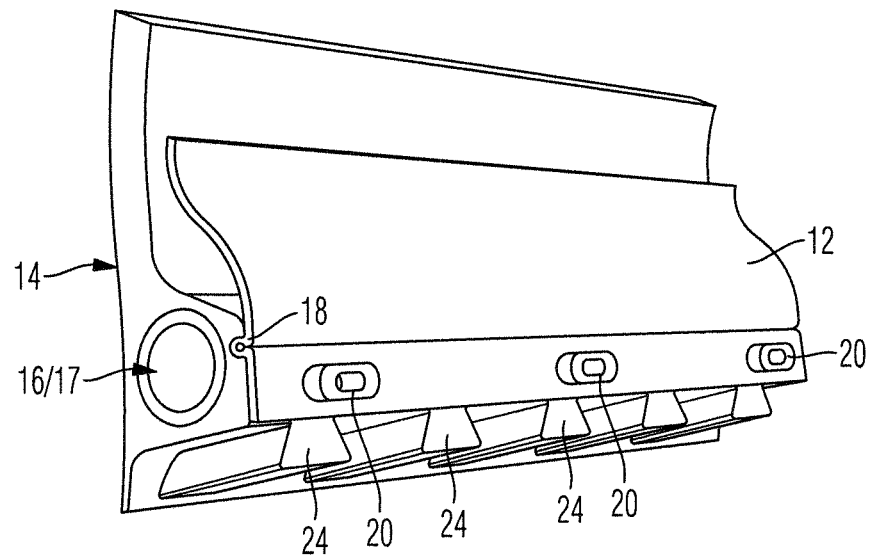
Figure 1E:
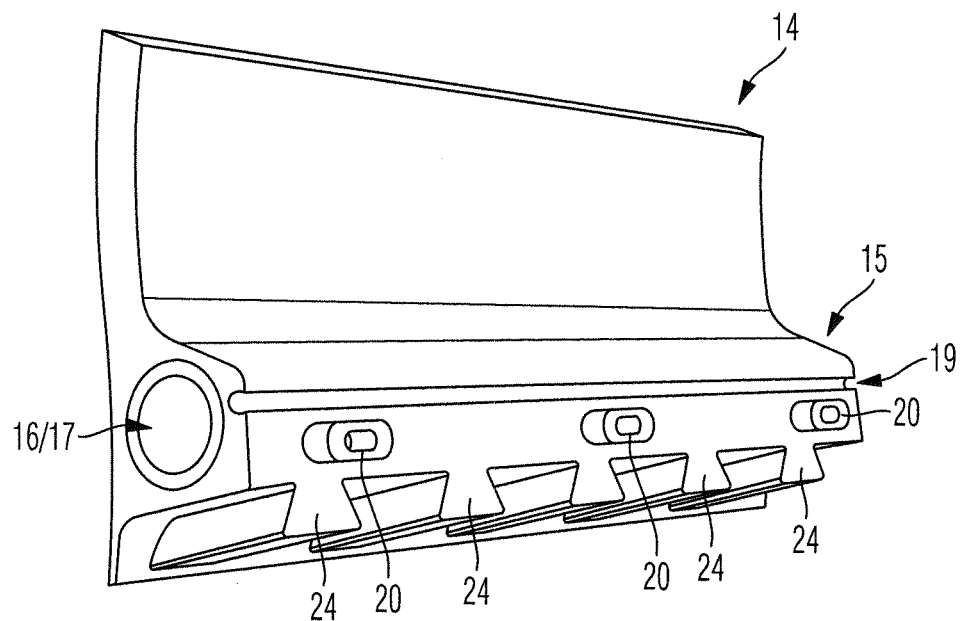
Figure 1F:
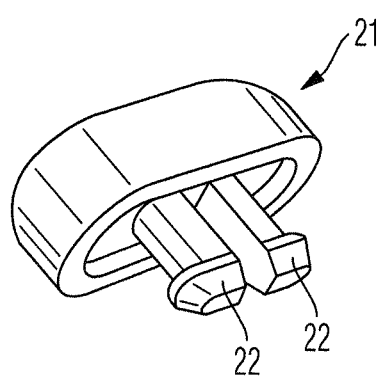
Figure 1G:
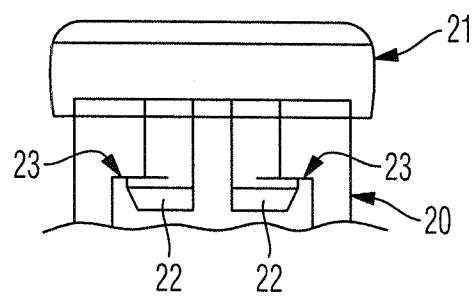

According to FIG. 1e, cylinder-like fastening bushes 20 are formed on the weatherstrip 15 adjacent the groove 19 that engages the projection 18 of the actuating element 12. The fastening bushes 20 extend through the region of the actuating element 12 that is between the portions 13 and 14 of the spoiler lip 11 (see FIG. 1d) and further extend through the bottom portion 13 of the spoiler lip 11 (see FIG. 1c).

Cover-like fasteners 21 can be inserted into the cylinder-like fastening bushes 20 for installation purposes. In the exemplary embodiment shown in FIGS. 1a to 1g, the cover-like fastening elements 21 are clips with barb-like projections 22 that engage behind an undercut 23 in the respective cylinder-like fastening bushes 20.

The groove 19 that engages the projection 18 of the attachment element 12 and the cylinder-like fastening bushes 20 into which the clip-like fastening elements 21 engage are formed on a surface of the weatherstrip 15 that is at the rear in the operating position of the spoiler lip 11 and that runs approximately vertically in the operating position of the spoiler lip 11.

Projections 24 are formed on a surface of the weatherstrip 15 that runs substantially horizontally in the operating position of the spoiler lip 11 and therefore is offset by approximately 90° from the surface with the groove 19 and the fastening bushes 20, as shown in FIGS. 1d and 1e. The projections 24 engage in correspondingly contoured recesses on that portion 13 of the spoiler lip 11 that is at the bottom in the operating position. More particularly, the projections 24 are contoured to define a dovetail shape and to provide a dovetail connection between the portion 14 of the spoiler lip 11 that is at the top in the operating position and the portion 13 of the spoiler lip 11 that is at the bottom in operating position. The actuating element 12 is not between the portions 13 and 14 of the spoiler lip 11 in the area of the projections 24.

The dovetail connection ensures good force transmission between the two portions 13 and 14 of the spoiler lip 11 as the spoiler lip 11 is shifted between the extended operating position and the retracted inoperative position. Therefore, the spoiler lip 11 can expand transversely with respect to the longitudinal direction of the motor vehicle upon shifting the spoiler lip 11 into the extended operating position without relative movement between the two portions 13 and 14 of the spoiler lip 11.

FIGS. 2a to 2d show a front spoiler 25 according to a second embodiment of the invention. To avoid unnecessary repetition, the same reference numbers are used for identical subassemblies and only details through which the embodiment in FIGS. 2a to 2d differs from the embodiment in FIGS. 1a to 1g are described into below.

In the embodiment of FIGS. 1a to 1g, clip-like fastening elements 21 are provided for detachably fastening the portion 13 of the spoiler lip 11 that is at the bottom in the operating position and the actuating element 12 to the portion 14 of the spoiler lip 11 that is at the top.

In contrast thereto, the fastening elements 21 in the embodiment of FIGS. 2a to 2d are ball-ended pins with ball-like fastening heads 26 that engage in recesses 27 in the weatherstrip 15 of the portion 14 of the spoiler lip 11 that is at the top in the operating position. The embodiment of FIGS. 2a to 2b has no bushes that penetrate both the actuating element 12 and the portion 13 of the spoiler lip 11 that is at the bottom in the operating position. Rather, the ball-headed pin fastening elements 21 in the embodiment in FIGS. 2a to 2b penetrate the actuating element 12 and the portion 13 of the spoiler lip 11 that is at the bottom in the operating position.

Figure 2A:
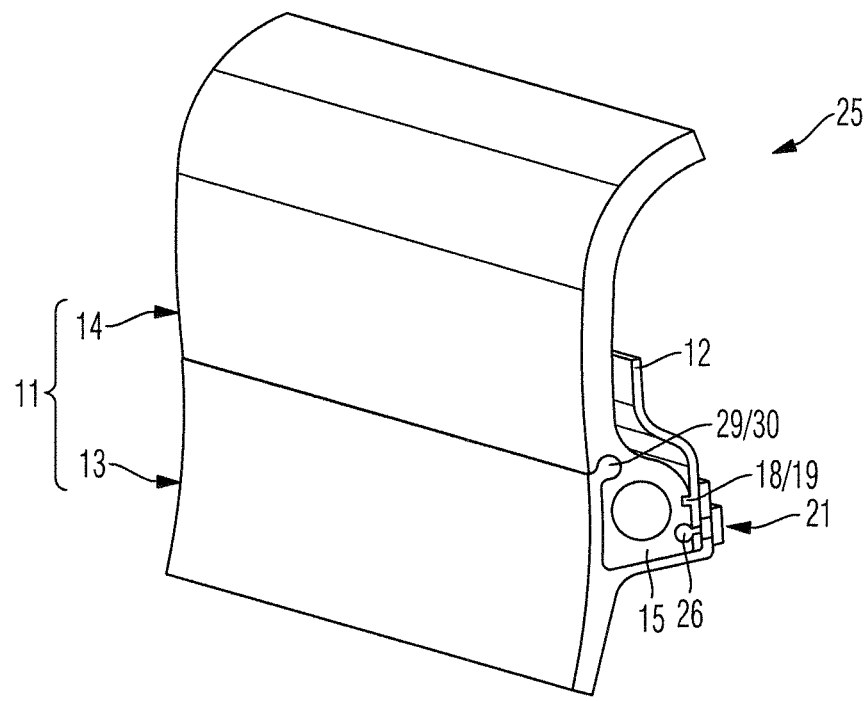
FIGS. 2a to 2d show different views of a second embodiment of a front spoiler according to the invention.
Figure 2B:
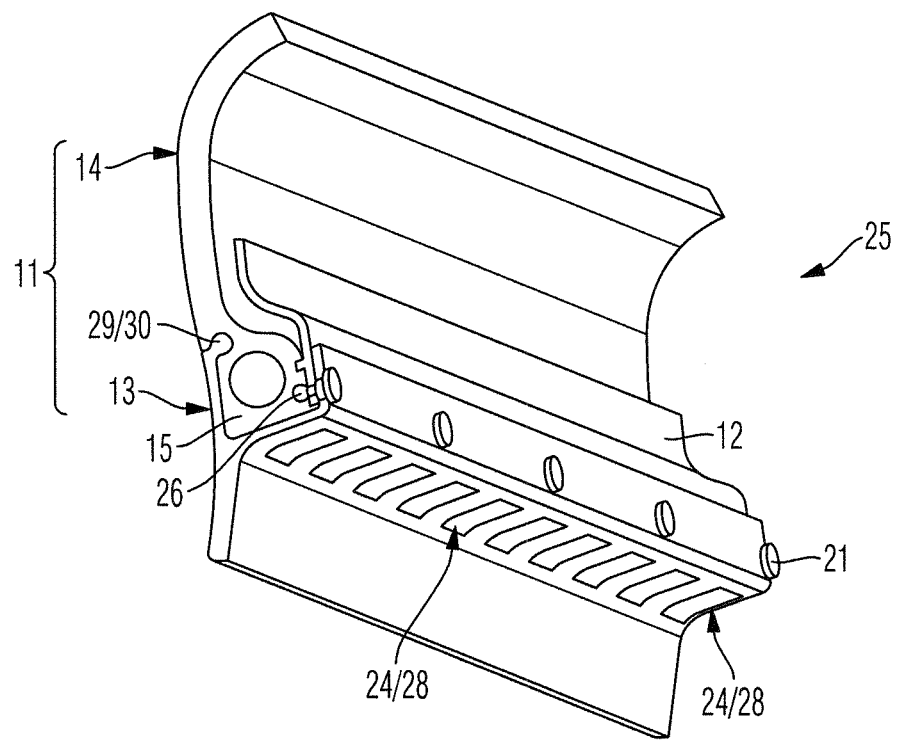
Figure 2C:
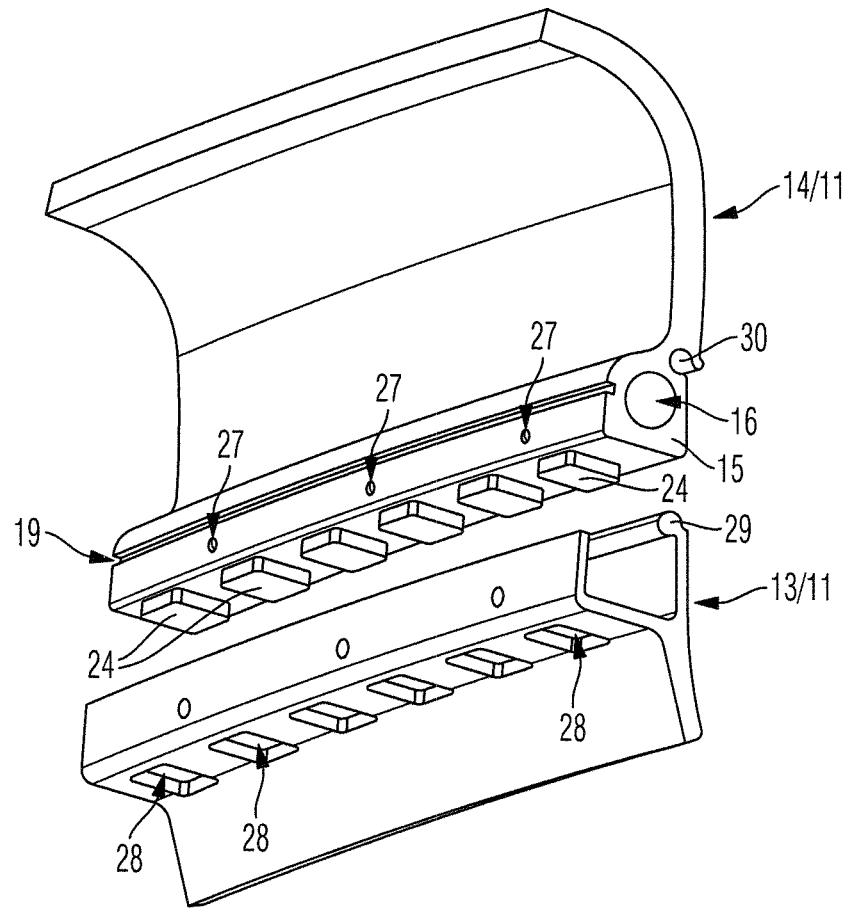
Figure 2D:
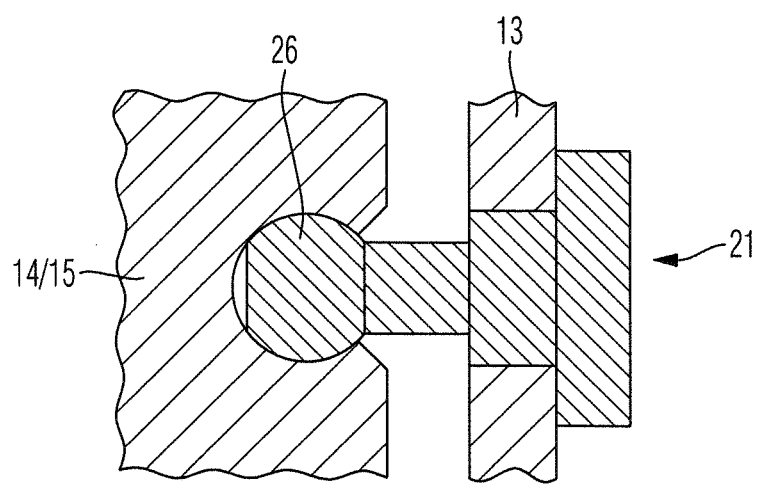

The embodiment of FIGS. 2a to 2b also has projections 24 formed on the weatherstrip 15 of the top portion 14 of the spoiler lip 11. The projections 24 project into corresponding recesses 28 in the portion 13 of the spoiler lip 11 that is at the bottom in the operating position (see FIG. 2b). Furthermore, in the exemplary embodiment in FIGS. 2a to 2d, The projections 24 are not contoured in the manner of a dovetail. Rather, the projections 24 in the embodiment of FIGS. 2a to 2d cooperate with the recesses 28 to form a "pin hole connection" between the portion 14 of the spoiler lip 11 at the top in the operating position and the portion 13 of the spoiler lip 11 at the bottom in the operating position. This also ensures that the spoiler lip 11, upon being shifted into the extended operating position, can expand transversely with respect to the longitudinal direction of the motor vehicle without relative movement between the two portions 13 and 14 of the spoiler lip 11. As in the embodiment in FIGS. 1a to 1d, no portion of the actuating element 12 is positioned in the region of the connection between the projections 24 and the recesses 28.

The projections 24 that connect with the recesses 28 are on a surface of the weatherstrip 15 that is approximately horizontal and perpendicular to the surface that is at the rear in the operating position of the spoiler lip 11. The two portions 13 and 14 of the spoiler lip 11 are connected detachably to each other at this rear surface of the weatherstrip 15 via the fastening elements 21 with a region of the actuating element 12 therebetween.

The portion 13 of the spoiler lip 11 that is at the bottom in the operating position has a projection 29 that engages into a recess 30 in the portion 14 of the spoiler lip 11 that is at the top in the operating position. The recess 30 is on a surface of the weatherstrip 15 that is at the front in the operating position of the spoiler lip 11 and that runs approximately parallel to the rear surface of the weatherstrip 15 at which the two portions 13 and 14 of the spoiler lip 11 connect detachable to one another and to the actuating element 12 via the fastening elements 21. As a result, a seal is provided between the two portions 13 and 14 of the spoiler lip 11 at the surface of the spoiler lip 11 that is at the front in the operating position so that neither water nor other dirt can penetrate between the two portions 13 and 14 of the spoiler lip 11. This construction also facilitates fixing the two portions 13 and 14 on the side of the spoiler lip 11 that is at the front in the operating position.

FIGS. 3a to 3d show a embodiment of a front spoiler according to the invention. More particularly, FIGS. 3a to 3d show the two portions 13 and 14 of the spoiler lip 11, but not an actuating element 12.

To avoid unnecessary repetitions, the same reference numbers are used for identical subassemblies and only details through which the embodiment in FIGS. 3a to 3d differs from the embodiments in FIGS. 1a to 2d are described below.

The embodiments in FIGS. 1a to 2d have separate fasteners for the detachably fastening of the two portions 13 and 14 of the spoiler lip 11 and the actuating element 12. More particularly, the embodiment of FIGS. 1a to 1d employs separate fastening clips 21 for the detachably fastening of the two portions 13 and 14 of the spoiler lip 11 and the actuating element 12 and the embodiment of FIGS. 2a to 2d employs separate ball head pins. 21 for the same purpose. However, the embodiment of FIGS. 3a to 3d does not employ separate fasteners for the detachably fastening of the two portions 13 and 14 of the spoiler lip 11 and the actuating element 12. Rather, the embodiment of FIGS. 3a to 3d has mushroom-head-like or cylinder-like fastening elements 21 formed integrally on the rear surface of the weatherstrip 15 of that portion 14 of the spoiler lip 11 that is at the top in the operating position.

The portion 13 of the spoiler lip 11 that is at the bottom in the operating position has recesses 31 that are dimensioned and disposed to receive the mushroom-head-like or cylinder-like fastening elements 21 that are formed integrally on the weatherstrip 15.

Figure 3A:
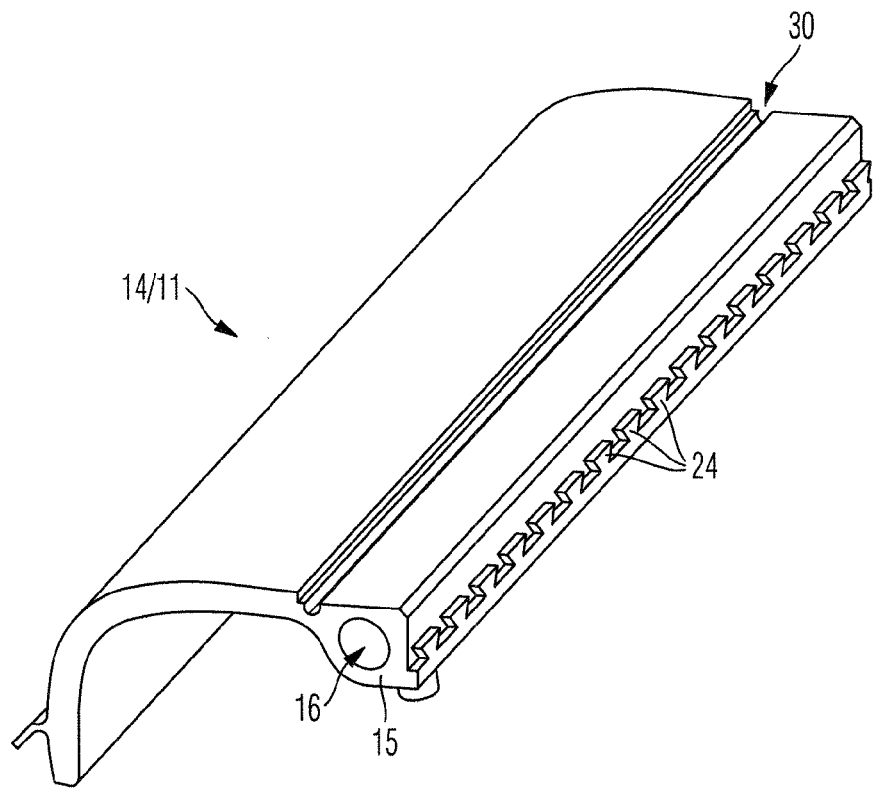
FIGS. 3a to 3d show different views of a third embodiment of a front spoiler according to the invention.
Figure 3B:
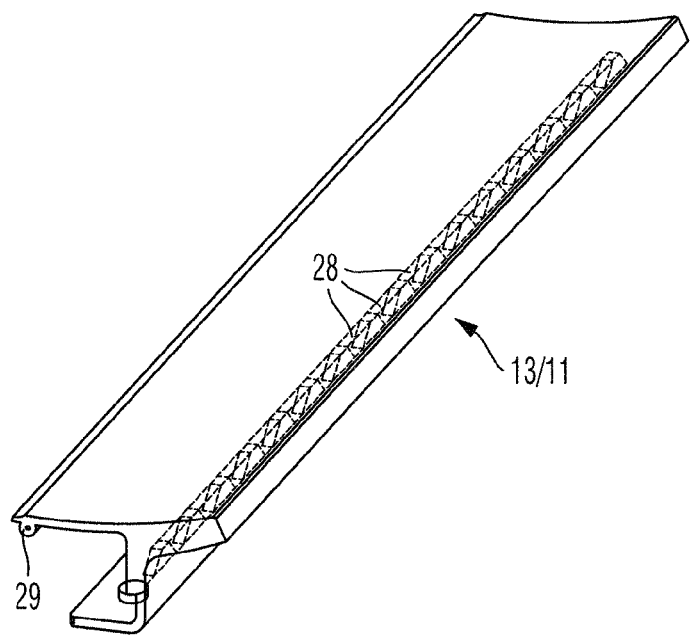
Figure 3C:
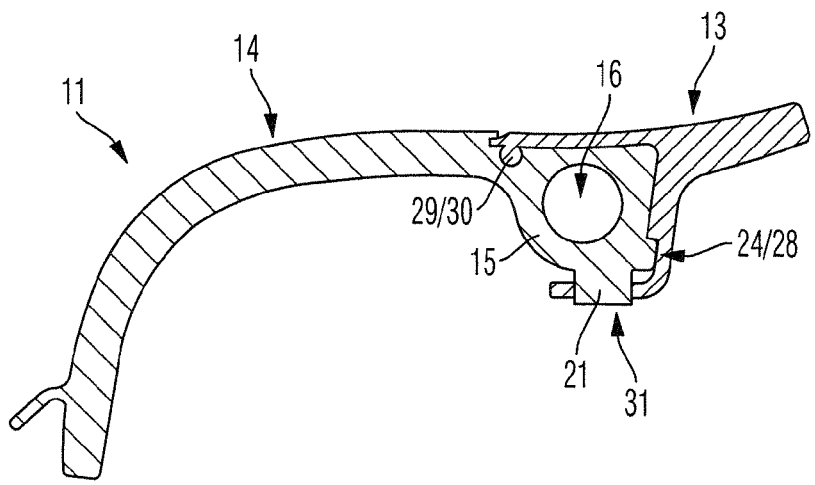
Figure 3D:
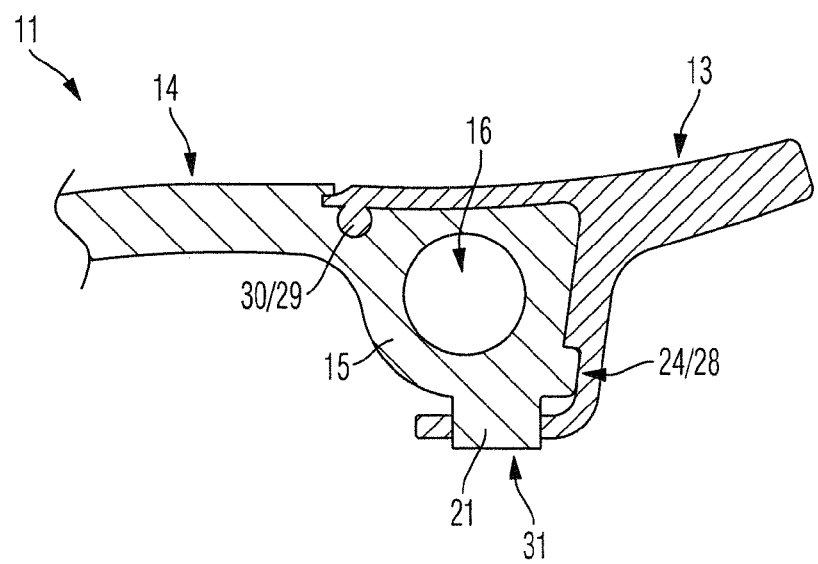

Dovetail-shaped projections 24 are formed on the bottom surface of the weatherstrip 15 and are received in correspondingly configured recesses 28 formed on the portion 13. The surface of the weather strip with the projections 24 is offset from the surface with the fastening elements 21 by substantially 90°. The engaged projections 24 and recesses 28 transmit force in the transverse direction of the motor vehicle when the spoiler lip is transferred between the retracted inoperative position and the extended operating position, specifically, as shown in FIGS. 3a and 3b.

Figure 4:
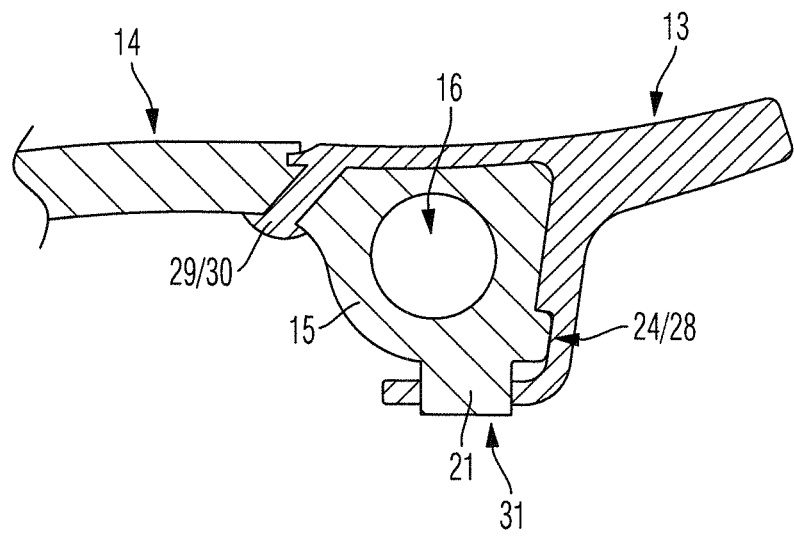
FIG. 4 shows a detail of a fourth embodiment of a front spoiler according to the invention.

FIG. 4 shows a variant of the embodiment shown in FIGS. 3a to 3d. In contrast to FIG. 3d, the projection 29 of FIG. 4 is formed on the portion 13 of the spoiler lip 11 that is at the bottom in the operating position and projects penetrates completely through a recess 30.

Figure 5:
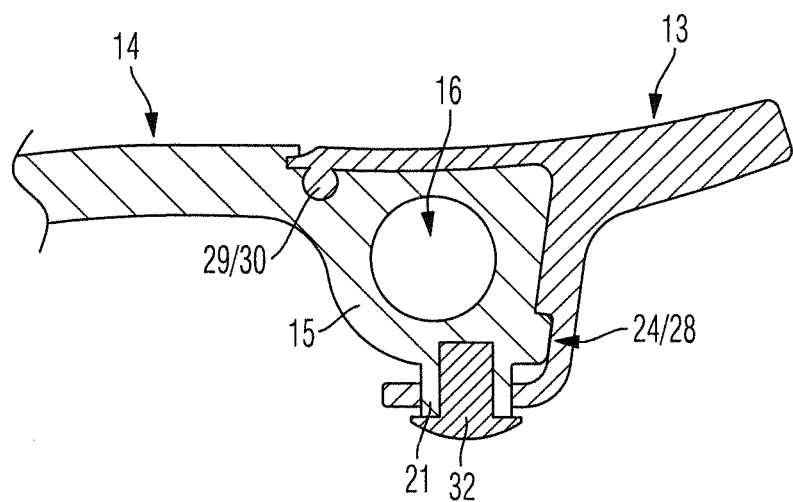
FIG. 5 shows a detail of a fifth embodiment of a front spoiler according to the invention.

FIG. 5 shows another variant of the embodiment shown in FIGS. 3a to 3d. More particularly, the embodiment of FIG. 5 has further fastening elements 32 in the region of the mushroom-head-like or cylinder-like projections 21 of the weatherstrip 15 to ensure additional fixing between the two portions 13 and 14 of the spoiler lip 11.

Figure 6:
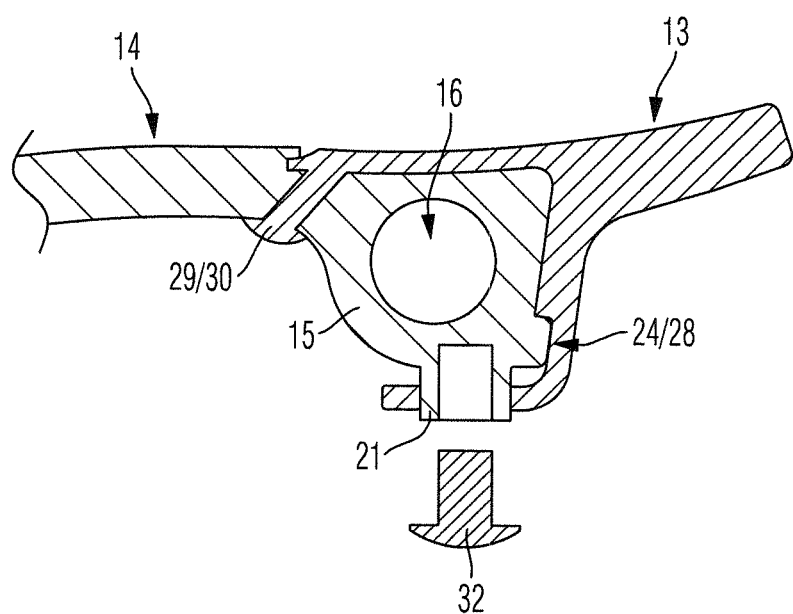
FIG. 6 shows a detail of another exemplary embodiment of a front spoiler according to the invention.

The variant embodiment in FIG. 6 is a combination of the embodiments in FIGS. 4 and 5.

The two portions 13 and 14 of the spoiler lip 11 preferably are manufactured from an elastically extendable material, for example from rubber or another rubber-like material. This ensures the expandability of the spoiler lip 11 upon shifting of from a retracted inoperative position into the extended operating position.

Magnetic particles can be embedded into the material of the portions 13 and 14 of the spoiler lip 11. Thus, strontium ferrite powder may be embedded into the portions 13 and 14 made from rubber. By this means, upon installation and in the fitted state, the two portions 13 and 14 are drawn magnetically and therefore frictionally to further improve the connection of the portions 13 and 14 of the spoiler lip 11.

What is claimed is:

1. A motor vehicle front spoiler, comprising: a spoiler lip in a region of a front part of the motor vehicle and extending over at least a part of a width of said front part, and support element disposed and configured to support the spoiler lip for movement between an extended operating position, in which the spoiler lip forms a downwardly directed extension of the front part with an aerodynamic air-guiding effect, and a retracted inoperative position, in which the spoiler lip is directed rearward with essentially no aerodynamic air-guiding effect, the spoiler lip having a replaceable bottom portion that is at a bottom in the operating position of the spoiler lip and a top portion that is at a top in the operating position of the spoiler lip, the top and bottom portions having projections and recesses that engage releasably with one another to hold the bottom portion replaceably on the top portion with a part of the support element held between the top and bottom portions.

2. The front spoiler of claim 1, wherein the top and bottom portions of the spoiler lip are connected to each other in a form-fitting manner.

3. The front spoiler of claim 1, wherein the top portion of the spoiler lip has a bottom end that is at a bottom position in the operating position of the spoiler lip, a channel being formed in the bottom end of the top portion of the spoiler lip and a spring-elastic element being inserted in the channel, the top portion of the spoiler lip and the bottom portion of the spoiler lip being connected to the bottom end of the top portion of the spoiler lip.

4. The front spoiler of claim 1, wherein a region of the support element between the top and bottom portions of the spoiler lip has a projection that engages sealingly into a recess in the top portion of the spoiler lip.

5. The front spoiler of claim 1, further comprising detachable fastening elements engaging regions of the top and bottom portions of the spoiler lip that have the support element positioned therebetween for holding the bottom portion to the top portion and the support element, whereby detachment of the fastening elements enables the portion of the spoiler lip that is at the bottom in the operating position of the spoiler lip to be detached from the top portion of said spoiler lip and from the support element.

6. The front spoiler of claim 5, wherein the fastening elements define screw connections.

7. The front spoiler of claim 5, wherein the fastening elements define one of clip connections, rivet connections, ball-headed pin connections and mushroom-headed connections.

8. A motor vehicle front spoiler, comprising: a spoiler lip in a region of a front part of the motor vehicle and extending over at least a part of a width of said front part, and a support element disposed and configured to shift the spoiler lip between an extended operating position, in which the spoiler lip forms a downwardly directed extension of the front part with an aerodynamic air-guiding effect, and a retracted inoperative position, in which the spoiler lip is directed rearward with essentially no aerodynamic air-guiding effect, the spoiler lip having a top portion that is at a top in the operating position of the spoiler lip and a replaceable bottom portion that is at a bottom in the operating position of the spoiler lip, projections formed at an end of the top portion of the spoiler lip that is at the bottom in the operating position of the spoiler lip, and recesses formed on the bottom portion of the spoiler lip intermeshing with the projections so that the top and bottom portions of the spoiler lip are connected to each other in a form-fitting manner and are detachable from one another.

9. The front spoiler of claim 8, wherein the projections and the recesses intermesh without the actuating support panel therebetween.

10. The front spoiler of claim 8, wherein the projections and recesses form at least one of a dovetail connection and pin hole connection.

11. The front spoiler of claim 9, wherein the projections and recesses intermesh at locations that are offset with respect to regions of the top portion and of the bottom portion of the spoiler lip on which the fastening elements hold the support element between the top portion and the bottom portion.

12. The front spoiler of claim 11, wherein the projections and recesses intermesh at locations that are offset by approximately 90° with respect to regions of the top portion and of the bottom portion of the spoiler lip on which the fastening elements hold the support element between the top portion and the bottom portion.

13. The front spoiler of claim 1, wherein the top portion of the spoiler lip and the bottom portion of the spoiler lip are manufactured from a magnetic material and are attracted magnetically.

14. The front spoiler of claim 13, characterized in that said portions are manufactured from at least one of a magnetic plastic and a magnetic rubber.

* * * * *